US011216640B2

(12) United States Patent
Andersson et al.

(10) Patent No.: US 11,216,640 B2
(45) Date of Patent: Jan. 4, 2022

(54) METHOD AND SYSTEM FOR TRANSITIONING A DEVICE CONTROLLER OF AN ELECTRONIC DEVICE FROM AN AT LEAST PARTLY INACTIVE MODE TO AN AT LEAST PARTLY ACTIVE MODE

(71) Applicant: Fingerprint Cards AB, Gothenburg (SE)

(72) Inventors: Markus Andersson, Lomma (SE); Eric Setterberg, Västra Frölunda (SE); Hans Thörnblom, Kungsbacka (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 385 days.

(21) Appl. No.: 15/439,501

(22) Filed: Feb. 22, 2017

(65) Prior Publication Data
US 2017/0243043 A1    Aug. 24, 2017

(30) Foreign Application Priority Data

Feb. 24, 2016 (SE) .................................. 1650234-6

(51) Int. Cl.
*G06K 9/00* (2006.01)
*G06F 21/32* (2013.01)

(52) U.S. Cl.
CPC ............. *G06K 9/001* (2013.01); *G06F 21/32* (2013.01); *G06K 9/0002* (2013.01); *G06K 9/00006* (2013.01); *G06K 9/0008* (2013.01); *G06K 9/00067* (2013.01); *G06K 9/00087* (2013.01);
(Continued)

(58) Field of Classification Search
CPC ........... G06K 9/00006; G06K 9/00013; G06K 9/0002; G06K 9/00067; G06K 9/00073; G06K 9/0008; G06K 9/00087; G06K 9/00093; G06K 9/001; G06K 9/00892; G06K 9/00899; G06K 9/00906; G06K 9/00926; G06K 2009/00953; G06K 2009/00959; G06K 9/00107; G06F 21/30; G06F 21/31; G06F 21/32; H04L 9/32; H04L 9/3231
USPC ................ 382/100, 115, 116, 124, 125, 181; 340/5.1, 5.8, 5.81–5.83; 380/247–250; 726/2–7, 16, 17, 26–28
See application file for complete search history.

(56) References Cited

U.S. PATENT DOCUMENTS 5,926,555 A * 7/1999 Ort ..................... G06K 9/00067
382/124
5,953,441 A 9/1999 Setlak
(Continued)

FOREIGN PATENT DOCUMENTS

WO    2013181361 A2    12/2013

OTHER PUBLICATIONS

Extended European Search Report dated Sep. 18, 2019 for European Application No. 17756924.1, 6 pages.

*Primary Examiner* — Eric Rush
(74) *Attorney, Agent, or Firm* — RMCK Law Group, PLC

(57) ABSTRACT

The present invention generally relates to a method for transitioning a device controller comprised with an electronic device from an at least partly inactive mode to an at least partly active mode, the electronic device further comprising a pre-processing module and a fingerprint sensor configured to acquire image data. The invention also relates to a corresponding electronic device and to a computer program product.

20 Claims, 5 Drawing Sheets

(52) U.S. Cl.
CPC ..... *G06K 9/00093* (2013.01); *G06K 9/00892* (2013.01)

(56) References Cited

U.S. PATENT DOCUMENTS

| | | | | | |
|---|---|---|---|---|---|
| 7,327,859 | B1* | 2/2008 | Chau | ................... | G06K 9/00046 382/116 |
| 7,333,637 | B2* | 2/2008 | Walfridsson | ....... | G06K 9/00087 382/124 |
| 7,361,919 | B2* | 4/2008 | Setlak | ................ | G06K 9/00013 382/115 |
| 7,505,613 | B2* | 3/2009 | Russo | ................ | G06K 9/00906 382/124 |
| 7,778,449 | B2* | 8/2010 | Shinzaki | .............. | G06K 9/0008 382/124 |
| 9,811,713 | B2* | 11/2017 | Pi | ....................... | G06K 9/00087 |
| 2003/0051138 | A1* | 3/2003 | Maeda | .................... | G06F 21/32 713/168 |
| 2004/0215615 | A1* | 10/2004 | Larsson | ............. | G06K 9/00087 382/115 |
| 2004/0230810 | A1* | 11/2004 | Hillhouse | .......... | G06K 9/00087 713/186 |
| 2005/0249381 | A1* | 11/2005 | Silvester | ............ | G06K 9/00013 382/115 |
| 2007/0230754 | A1* | 10/2007 | Jain | .................... | G06K 9/00093 382/125 |
| 2009/0316963 | A1* | 12/2009 | Boshra | ............... | G06K 9/00114 382/124 |
| 2012/0230555 | A1* | 9/2012 | Miura | ................ | G06K 9/00087 382/124 |
| 2013/0263252 | A1* | 10/2013 | Lien | ...................... | G06F 1/3215 726/19 |
| 2014/0026208 | A1* | 1/2014 | Coons | ................ | G06K 9/00087 726/16 |
| 2014/0056493 | A1* | 2/2014 | Gozzini | ............... | G06K 9/0012 382/124 |
| 2014/0198960 | A1* | 7/2014 | Thompson | ......... | G06K 9/00013 382/124 |
| 2016/0125223 | A1* | 5/2016 | Boshra | ................ | G06K 9/6857 382/124 |

\* cited by examiner

METHOD AND SYSTEM FOR TRANSITIONING A DEVICE CONTROLLER OF AN ELECTRONIC DEVICE FROM AN AT LEAST PARTLY INACTIVE MODE TO AN AT LEAST PARTLY ACTIVE MODE

FIELD

The present invention generally relates to a method for transitioning a device controller comprised with an electronic device from an at least partly inactive mode to an at least partly active mode, the electronic device further comprising a pre-processing module and a fingerprint sensor configured to acquire image data. The invention also relates to a corresponding electronic device and to a computer program product.

BACKGROUND OF THE INVENTION

Various types of biometric systems are used more and more in order to provide an increased security for accessing an electronic device and at the same time keep the user convenience at an acceptable level. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important.

All capacitive fingerprint sensors provide an indicative measure of the capacitance between several sensing elements and a finger placed on the surface of the fingerprint sensor. Acquisition of a fingerprint image is typically performed using a fingerprint sensor comprising a plurality of sensing elements arranged in a two-dimensional manner, and a block based technique may be applied to the fingerprint sensor for acquiring a fingerprint image, where the blocks of sensing elements are sampled sequentially.

One of the problems associated with fingerprint sensors concerns spurious finger detects caused by the fingerprint sensor trying to image objects other than fingerprints. In most electronic devices the location of the fingerprint sensor is easily accessible in order to maintain user convenience. However, the easily accessible location also means that other objects such as coins or even wet pocket lining comes into contact with the fingerprint sensor and these objects can in principle also be imaged. This triggers spurious finger detects which causes the host processor to wake up and try to run the recognition algorithm. Thereby, spurious finger detects causes for example unnecessary battery power consumption and unwanted activation of a lockdown mechanism due to failed recognition after a few attempts.

Thus, there is a need for improvements with regards to spurious finger detects by fingerprint sensors.

SUMMARY OF THE INVENTION

In view of above-mentioned and other drawbacks of the prior art, it is an object of the present invention to provide an improved method for transitioning a device controller comprised with an electronic device from an at least partly inactive mode to an at least partly active mode.

According to an aspect of the present invention, it is therefore provided a method for transitioning a device controller comprised with an electronic device from an at least partly inactive mode to an at least partly active mode, the electronic device further comprising a pre-processing module and a fingerprint sensor configured to acquire image data, said method comprising the steps of determining the presence of an object at a vicinity of the fingerprint sensor, acquiring, using the fingerprint sensor, image data representative of the object, pre-processing the acquired image data, using the pre-processing module, to determine features indicative of a fingerprint, matching, using the pre-processing module, the determined features with at least a set of stored fingerprint features of a finger of a user of the electronic device, and generating an instruction to transition the device controller to the at least partly active mode if a result of the matching indicates that the acquired image data corresponds to the at least one finger of the user of the electronic device.

The present invention is based upon the realization that a pre-processing step may be performed as a pre-qualifying step before taking a decision to transitioning the device controller to the at least partly active mode. Thus, the pre-processing is performed in the partly in-active mode of the device controller without transitioning the device controller (the "host"). In this way, it is only after the pre-processing step that the device controller is activated and may perform any additional steps or operations. For example, if it is determined in the pre-processing step that the object is not a finger, the device controller may remain in the at least partly in-active mode. However, if it is determined that the acquired image data comprises features indicative of features of a stored fingerprint, the device controller is transitioned to the partly active mode (i.e. "woken up"). In the pre-processing step there is made a matching in the pre-processing module, this matching is different from authentication, for example the matching in the pre-processing step performs a "rough" check of whether or not the features in the image data may match stored fingerprint features, and not a full authentication with stored fingerprint templates. In accordance with the invention, fingerprint features may for example be fingerprint ridge flow characteristics.

It should be understood that once the device controller is in the at least partly inactive mode, the electronic device is typically operated in a first power consumption mode. Conversely, once the device controller is in the at least partly active mode, the electronic device is typically operated in a second power consumption mode, where the first power consumption mode is a low power consumption mode as compared to the second power consumption mode. Accordingly, the pre-processing step as disclosed above is typically performed while the electronic device is operated in the low power consumption mode, thus saving energy in case no matching is made. In accordance to one embodiment, the step of matching may comprise determining a matching score between the image data and the at least a set of stored fingerprint features, and determining that the image data corresponds to stored fingerprint features of the at least one finger of the user of the electronic device if the matching score exceeds a threshold. The matching degree may thus be tailored to a desired level by setting the matching score threshold to a corresponding level. Furthermore, it may also be advantageous to divide a recognition algorithm into e.g. a coarse part and a detailed part, where the coarse part may be integrated in the pre-processing matching step performed by the pre-processing module. To perform verification (e.g. matching), the input data (e.g. the image data) needs to be processed into a format that can be mathematically compared with the data stored in the previously enrolled template (e.g. stored fingerprint features). The matching method that then judges the similarity between the input data and the template data is referred to as a matching algorithm. Typically a matching algorithm will output a similarity score, a high such score indicating a close match between input data and template data and a low score indicating that the input data and the template data is significantly dissimilar. The decision if a match should be classified as that the input image data and the template data is coming from the same finger or not is commonly implemented as threshold on similarity score, above or equal to the threshold the match is "accepted", below it is "rejected". The threshold is referred to as the security threshold.

According an embodiment of the invention, the method may further comprise the steps of providing the acquired image data to the device controller, and performing a fingerprint authentication procedure, using the device controller, based on the image data and at least a fingerprint template. Thus the actual fingerprint authentication of the fingerprint of a specific user is performed by the device controller by matching the image data with stored fingerprint templates. Thereby, the device controller may perform the fingerprint authentication procedure in the partly active mode only after the pre-processing with the pre-processing module.

According an embodiment of the invention, a false accept rate of the matching, using the pre-processing module, is substantially higher than a false accept rate of the fingerprint authentication procedure. Thus, the matching using the pre-processing module is performed with a lower level of security which enables the pre-processing module to operate in a pre-qualifying way to perform a "rough" check of the image data. The full authentification may be performed subsequently with the device controller if it is transitioned to the partly active mode. As an example, the false accept rate (FAR) matching, using the pre-processing module may be e.g. in the range of 1/200 to 1/10, for example 1/100 or 1/50. A typical FAR in the authentication procedure is in the range of 1/200 000 to 1/10 000, for example 1/100 000 or 1/50 000.

In one embodiment the method may further comprise the steps of providing, to the device controller, information relating to the matching performed at the pre-processing module, wherein the fingerprint authentication procedure is further based on the information relating to the matching at the pre-processing module. Information from the matching performed by the pre-processing module may thus be used also by the device controller in the fingerprint authentication procedure. By re-using the information from the matching performed by the pre-processing module the fingerprint authentication procedure may be sped up and thus requiring less power and time. The information may relate to the determined features indicative of a fingerprint.

A further method step according to an embodiment may be unlocking the electronic device if the fingerprint authentication procedure results in a decision that the image data matches the at least one fingerprint template. In other words, if the fingerprint authentication procedure indicates that the fingerprint features correspond to at least one finger of a specific user, the electronic device may be unlocked, thus available for use.

The fingerprint ridge flow characteristics may for example comprise a set of global ridge flow patterns. The set of global ridge flow patterns may comprise at least one of information relating to an arch, a tented arch, a right loop, a left loop, and a whorl. Other global ridge flow patterns are also possible to use such as double loop, and global singularities, e.g. core and delta.

Alternatively or additionally, the fingerprint ridge flow characteristics may comprise a set of local ridge flow descriptors. The set of local ridge flow descriptors may comprise at least one of local ridge orientation, or ridge curvature, or ridge density. Local ridge flow descriptors may be extracted for example in the frequency domain using Fourier analysis as well as by analyzing local gradients in the spatial domain.

According to an embodiment of the invention, the method may further comprise the step of updating the predetermined fingerprint ridge flow characteristics based on the acquired image data. In other words, the method may be used in an adaptive mode in which the models (e.g. fingerprint templates) and thresholds (e.g. matching score) may be updated. This may improve the reliability of the matching in the pre-processing module, and reduce the time needed for matching further. Updating the models is advantageous when tracking the slight changes in fingerprint characteristics that may be introduced by changes in temperature and humidity (e.g. due to different seasons over the year) as well as due to temporary wear on the fingerprint from working with the hands.

The pre-processing module may be comprised with control circuitry provided with the fingerprint sensor. Thus, in one embodiment the pre-processing module is integrated with the fingerprint sensor. Thereby, the pre-processing module is separate from the device controller. In another embodiment, the pre-processing module may be a component of the device controller.

In one embodiment of the invention, the at least partly inactive mode is a low power mode and the at least partly active mode is a normal operational mode for the device controller. Thus, a partly in-active mode may be generally known as a "low power mode" or an "idle mode" and a partly active mode may be known as a "normal power mode" relative to the "low power mode".

According to another aspect of the present invention, there is provided an electronic device, comprising a device controller, the device controller configured to be arranged in an at least partly inactive mode or an at least partly active mode, a pre-processing module, and a fingerprint sensor configured to acquire image data, wherein the electronic device is arranged to determine the presence of an object at a vicinity of the fingerprint sensor, acquire, using the fingerprint sensor, image data representative of the object, pre-process the acquired image data, using the pre-processing module, to determine features indicative of a fingerprint, match, using the pre-processing module, the determined features with at least a set of stored fingerprint features of a finger of a user of the electronic device; and generate an instruction to transition the device controller from the at least partly inactive mode to the at least partly active mode if a result of the matching indicates that the acquired image data corresponds to the at least one finger of the user of the electronic device. This aspect of the invention provides similar advantages as discussed above in relation to the previous aspect of the invention.

The fingerprint sensor may be implemented using any kind of current or future fingerprint sensing principle, including for example capacitive, optical, or thermal sensing technology. However, at present capacitive sensing is most preferred. Both one and two-dimensional sensors are possible and within the scope of the invention. Furthermore, the electronic device may advantageously be a mobile phone. However, other electronic devices are of course thinkable such as tablets, laptops desktop computers, etc.

Within the context of the invention, the expression "fingerprint image" should be interpreted broadly and to include both a regular "visual image" of a fingerprint of a finger as well as a set of measurements relating to the finger when acquired using the fingerprint sensor. In addition, the expression "processing circuitry" should be understood to include any type of computing device, such as an ASIC, a microprocessor, etc. It should also be understood that the actual implementation of such a processing circuitry may be divided between a plurality of devices/circuits.

The fingerprint sensing system preferably forms part of an electronic device further comprising a device controller for performing an authentication of the finger based on the at least one selected fingerprint image, and performing at least one action only if the authentication indicates an authentication success. Such an action may for example be for unlocking a locked portable device, e.g. in case the portable device is a mobile phone. The at least one action may of course be any type of action suitably used when there is a need to authenticate a finger.

According to a further aspect of the present invention, there is provided a computer program product comprising a computer readable medium having stored thereon computer program means for controlling an electronic device, the electronic device comprising a device controller configured to be arranged in an at least partly inactive mode or an at least partly active mode, a pre-processing module, and a fingerprint sensor configured to acquire image data, wherein the computer program product comprises code for determining the presence of an object at a vicinity of the fingerprint sensor, code for acquiring, using the fingerprint sensor, image data representative of the object, code for pre-processing the acquired image data, using the pre-processing module, to determine features indicative of a fingerprint, code for matching, using the pre-processing module, the determined features with at least a set of stored fingerprint features of a finger of a user of the electronic device, and code for generating an instruction to transition the device controller to an at least partly active mode if a result of the matching indicates that the acquired image data corresponds to the at least one finger of the user of the electronic device. Also this aspect of the invention provides similar advantages as discussed above in relation to the previous aspects of the invention.

In summary, the present invention generally relates to a method for transitioning a device controller comprised with an electronic device from an at least partly inactive mode to an at least partly active mode, the electronic device further comprising a pre-processing module and a fingerprint sensor configured to acquire image data. Advantages of the invention include the possibility of reducing power consumption, increase speed of accessing the electronic device from a locked mode, and avoiding lockdown of the fingerprint sensor due to failed matches with objects (e.g. coins) other than fingers.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
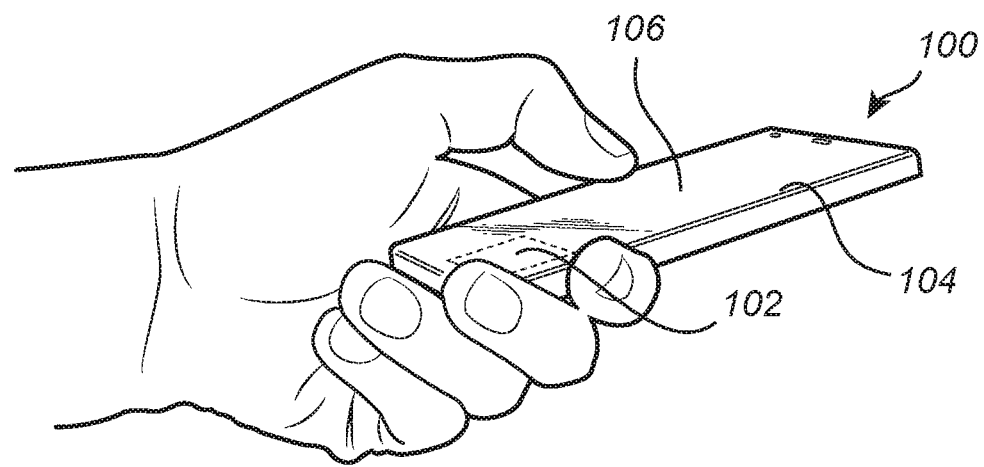
FIG. 1 schematically exemplify an electronic device according to the present invention, in the form of a mobile phone comprising an integrated fingerprint sensor.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated the electronic device according to the present invention, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the backside of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
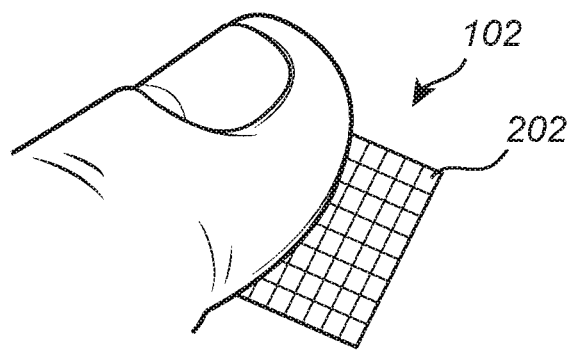
FIG. 2 schematically shows the fingerprint sensor array comprised in the electronic device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 202.

Figure 3A:
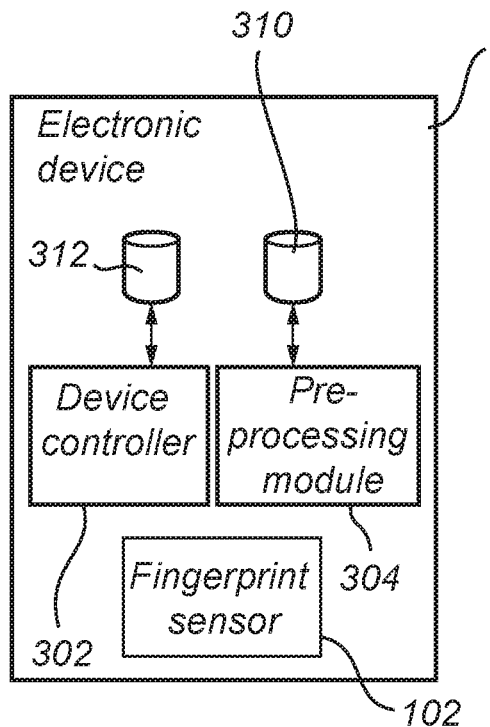
FIGS. 3A-3F schematically illustrates the method steps for transitioning a device controller of an electronic device from a partly in-active mode to an active mode, according to an embodiment of the invention.
Figure 3B:
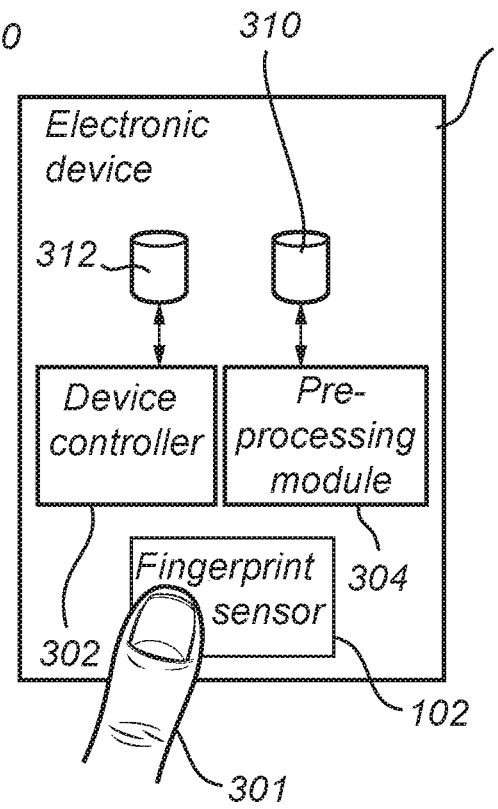
Figure 6:
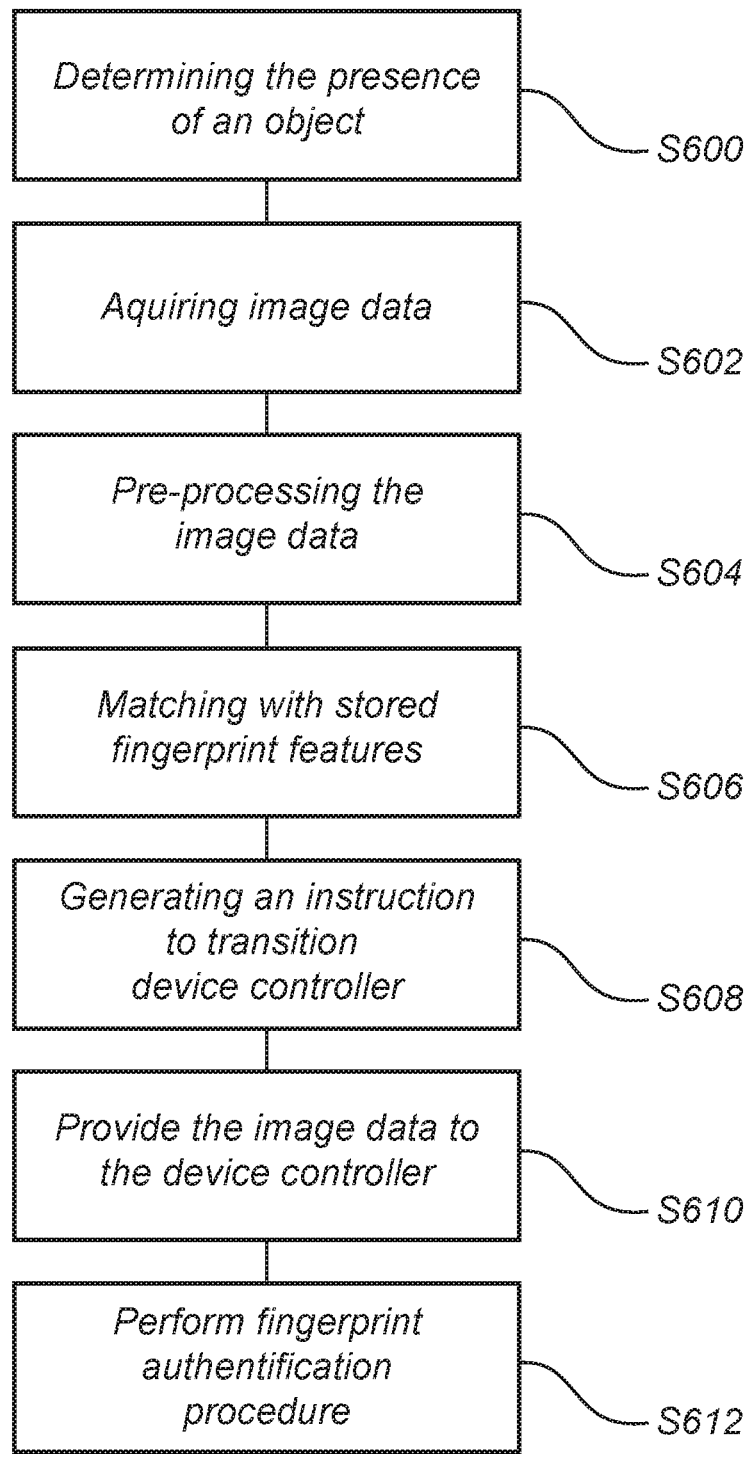
FIG. 6 is a flow-chart of method steps according to an embodiment of the invention.

In FIGS. 3A-3F in conjunction with FIG. 6 there is conceptually shown method steps (S600-S612 in FIG. 6) according to an embodiment of the invention. In FIG. 3A there is schematically shown an electronic device 300, a device controller 302 comprised in the electronic device 300, the electronic device 300 further comprising a pre-processing module 304 and a fingerprint sensor 102. The electronic device 300 may be the mobile phone 100 illustrated in FIG. 1. The fingerprint sensor 102 is configured to acquire image data of an object 301. In a first step (S600) illustrated in FIG. 3B, the presence of an object in the vicinity of the fingerprint sensor 102 is determined. This may be done by the fingerprint sensor 102, or by any other type of suitable sensor, e.g. ultrasonic, optical, etc. The fingerprint sensor 102 may determine the presence of the object 301 by determining that there is an input on one of the sensing elements 202 described with reference to FIG. 2. The device controller 302 is in a partly in-active mode, e.g. an idle mode or a "low power" mode.

Figure 3C:
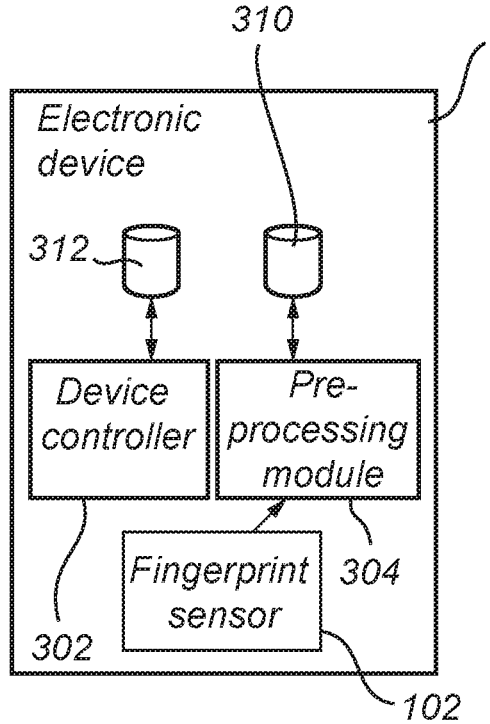

Subsequently (S602), the fingerprint sensor 102 acquires image data representative of the object 301. Thus, at this stage, the fingerprint sensor 102 acquires image data of the object still being unidentified to the electronic device 300. The device controller is still in the partly in-active mode. Next, as schematically illustrated in FIG. 3C, the pre-processing module 304 receives the image data from the fingerprint sensor 102 so that the image data may be pre-processed (S604) in order to perform a pre-qualification of the image data. The pre-processing module 304 is configured to determine features in the image data, the features may be indicative of a fingerprint. The device controller 302 is still in the partly in-active mode. Note that the pre-processing module may be comprised with control circuitry (not shown) which may be provided with the fingerprint sensor 102, thus the pre-processing module 304 may be part of the fingerprint sensor 102. Alternatively, the pre-processing module 304 may be a component of the device controller 302, thus the pre-processing module 304 may be integrated with the device controller 302.

Figure 3D:
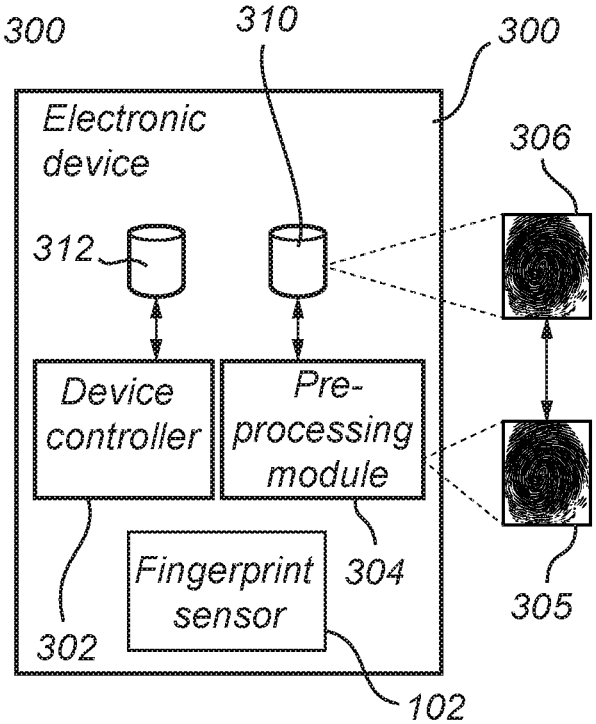

Subsequently (S606), as is schematically illustrated in FIG. 3D, the pre-processing module 304 performs a matching procedure in which the determined features in the image data are matched with stored fingerprint features 306 of a finger of a user of the electronic device 300. This matching step is not performed as a full fingerprint authentication procedure, but instead a pre-qualifying matching to determine if the features in the image data determined by the pre-processing module has a chance of matching the stored fingerprint features in a subsequent authentication step. Thus, the stored fingerprint features do not have to be full fingerprint templates, but at least part of a fingerprint template is accessible to the pre-processing module 304. For example, the pre-processing module may have access to data storage 310 of at least part of a fingerprint template whereas the device controller 302 may have access to a data storage 312 of full fingerprint templates. The data storage 312 is preferably a secure data storage 312. The storages 310 and 312 may also be combined in a single storage to which the pre-processing module 304 and the device controller 302 may access different parts of the combined storage.

Figure 3E:
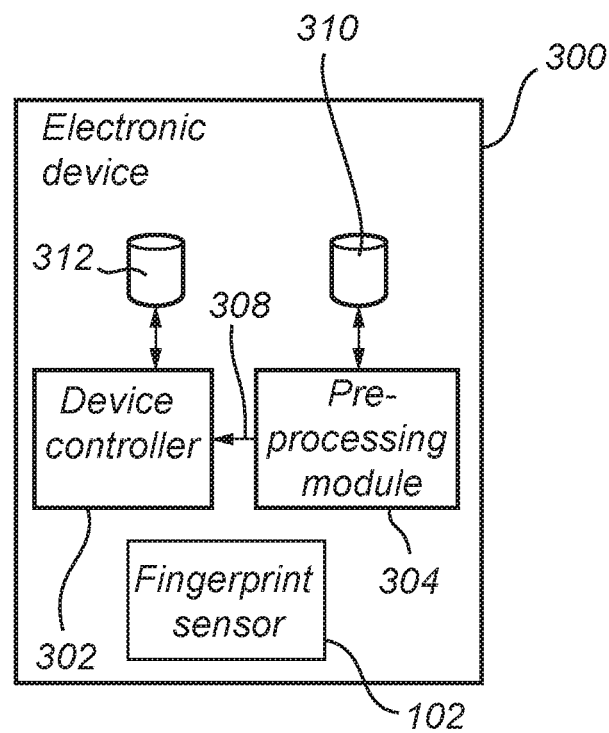
Figure 3F:
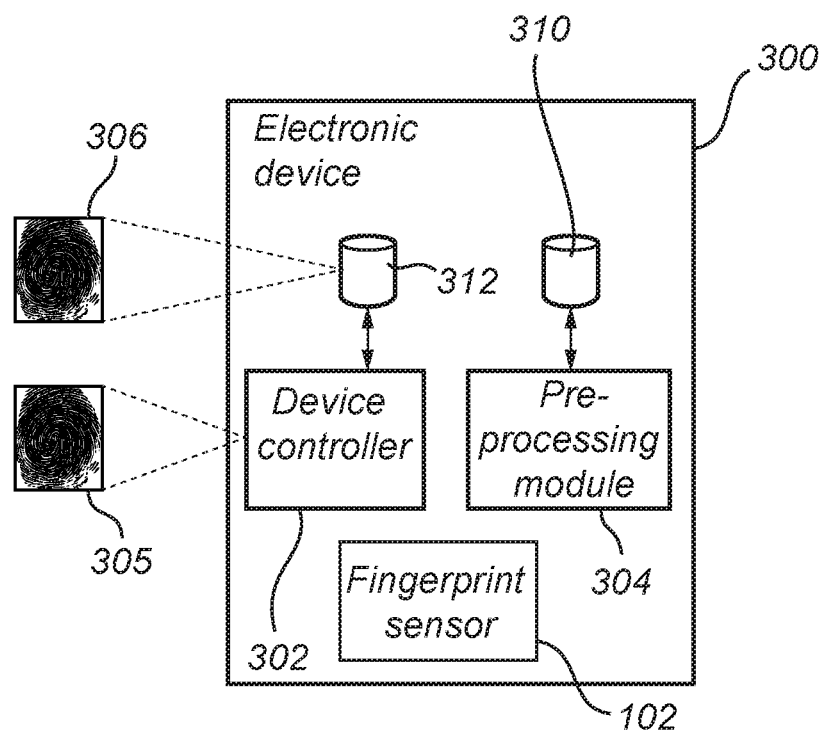

Next, as illustrated in FIG. 3E, if the result of the matching is that the image data 305 indicative of a feature of the object corresponds to the stored fingerprint features 306, the pre-processing module 304 generates (S608) an instruction 308 to transition the device controller 302 to the at least partly active mode, e.g. a normal mode of operation for the device controller 302. Thus, the device controller 302 may be in the partly in-active mode during the pre-processing steps performed by the pre-processing module 304. However, if it is determined that the image data 305 indicative of a feature of the object does not correspond to the stored fingerprint features 306, there is no need to transition the device controller to the at least partly active mode, thus no such instruction is generated by the pre-processing module 304, and the device controller 302 remains in the partly in-active mode, thus there is no need to "wake up" the host (device controller 302) in this case.

In addition to providing the instruction 308 to the device controller 302, the pre-processing module may also provide (S610) to the device controller 302 information obtained from the matching of the features in the image data 305 with the stored fingerprint features 306. For example, if an instruction for transitioning the device controller 302 to the partly active mode is provided, information relating to matching features may also be provided to the device controller 302. The device controller 302 may continue to perform (S612) a full fingerprint authentication (schematically shown in FIG. 3F), and in such case the device controller 302 already has some matching information which may speed up the fingerprint authentication procedure. If the fingerprint authentication procedure results in a decision that the image data 305 matches the at least one fingerprint template 306, the device controller may decide to unlock the electronic device 300. However, if the image data 305 does not match the fingerprint template 306, the device controller does not unlock the electronic device 300. The locking function may for example be screen lock for the mobile phone 100.

The image data 305 may be provided to the device controller 302 from the pre-processing module 304 or from the fingerprint sensor 102. The matching performed by the pre-processing module 304 may be performed using the process, e.g. software, as the fingerprint authentication, or the matching performed by the pre-processing module 304 may be performed in a process parallel with the fingerprint authentication. In other words, the matching and the fingerprint authentication may be integrated with each other or performed separate. Furthermore, a false accept rate of the matching, using the pre-processing module, is preferably substantially higher than a false accept rate of the fingerprint authentication procedure. Thus, the matching using the pre-processing module is performed a different levels of security. For example, the features used in the matching with the pre-processing module are less complex and thereby requires less processing power than a full authentication. The full authentication may be performed subsequently with the device controller if it is transitioned to the partly active mode. As an example, the false accept rate (FAR) of the matching, using the pre-processing module may be e.g. in the range of 1/200 to 1/10, for example 1/100 or 1/50. A typical FAR in the authentication procedure is in the range of 1/200 000 to 1/10 000, for example 1/100 000 or 1/50 000.

Figures 4A, 4B, 4C:
FIGS. 4A-4F show exemplary fingerprint ridge flow characteristics in the form of global ridge flow patterns.
Figures 4D, 4E, 4F:
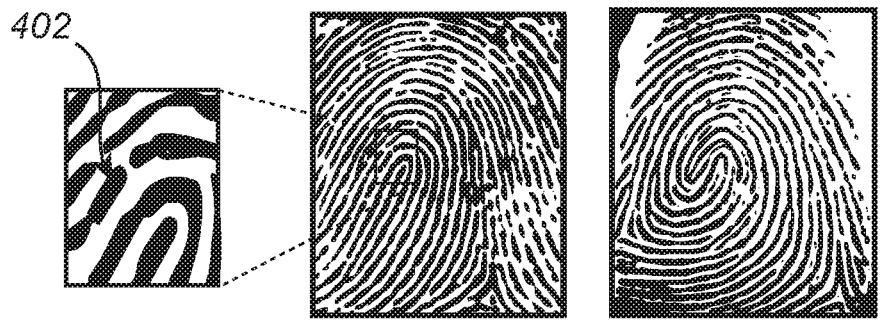

The matching performed by the pre-processing module 304 may be performed based on fingerprint ridge flow characteristics. Exemplary fingerprint ridge flow characteristics in the form of global ridge flow patterns are conceptually illustrated in FIGS. 4A-4F. For example, the fingerprint ridge flow characteristics may comprises a set of global ridge flow patterns shown in FIGS. 4A-4F, such as relating to an arch (FIG. 4A), a tented arch (FIG. 4B), a right loop (FIG. 4C), a left loop (FIG. 4D), and a whorl (FIG. 4E). The global ridge flow patterns may for example be taken from fingerprint classifications such as the Henry scheme. Global singularities such as core and delta point can also be detected, for instance by computing the Poincare index of the local orientation field. Alternatively or additionally, the fingerprint ridge flow characteristics may preferably comprise a set of local ridge flow descriptors (e.g. based on characteristics of the ridges indicated in FIG. 4F where a single ridge is indicated by the numeral 402) of the fingerprint such as e.g. local ridge orientation, or ridge curvature, or ridge density. These may be applied in both gradient based methods as well as methods applied in the Fourier domain.

The matching step performed by the pre-processing module 304 may comprise determining a matching score between the image data 305 and the stored fingerprint features 306. If the matching score exceeds a threshold, it may be determined that the image data corresponds to stored fingerprint features of the at least one finger of the user of the electronic device 300. The matching score may be determined by comparing more or less coarse versions of the local ridge flow descriptors or for example more general features derived from the local ridge flow descriptors such as histograms, mean, and/or variance.

In addition, in a further exemplary embodiment of the invention, the described method may implement an adaptive mode in which the predetermined fingerprint ridge flow characteristics is updated based on the acquired image data. For example, features from image data 305 which was determined to not be a fingerprint may be used to update thresholds or models. Similarly, if the features are determined to originate from a fingerprint, the corresponding models (e.g. ridge flow characteristics) may be updated accordingly.

Figure 5:
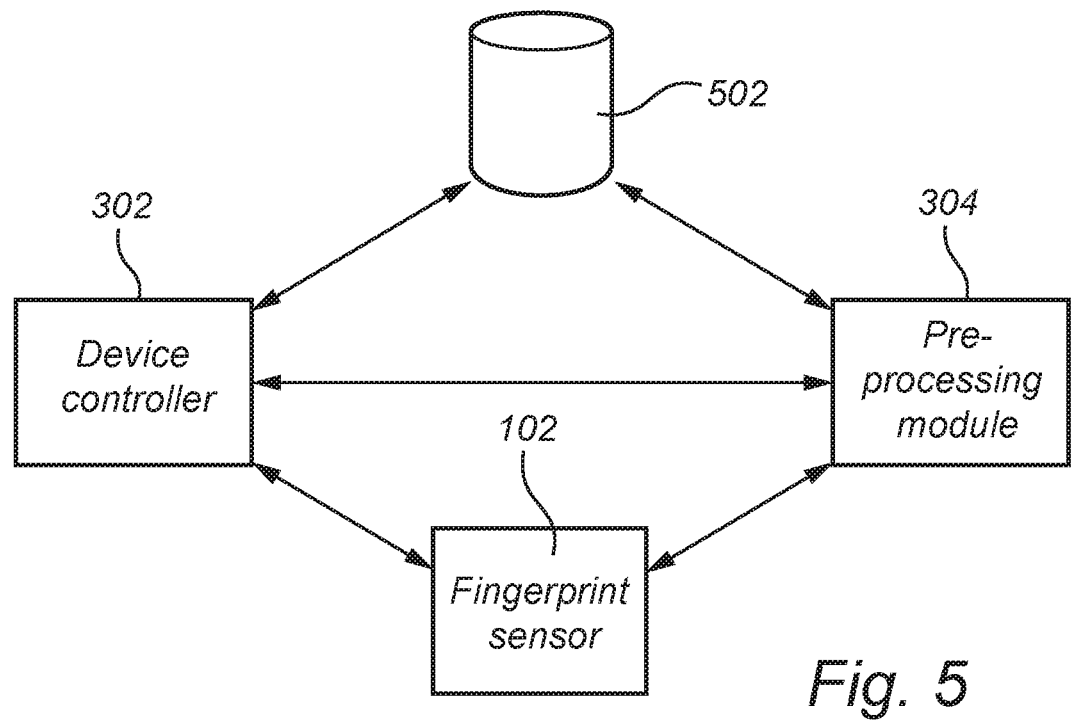
FIG. 5 conceptually illustrates an electronic device according to a currently preferred embodiment of the invention.

FIG. 5 conceptually illustrates an electronic device 300 according to an embodiment of the invention. The electronic device 300 may for example be a mobile phone as described with reference to FIG. 2. The electronic device 300 comprises a device controller 302, a pre-processing module 304, and a fingerprint sensor 102, and in addition a data storage 502 for storing fingerprint templates. The data storage 502 may alternatively be integrated with the device controller but is shown separate from the device controller 302 in FIG. 5. The fingerprint sensor may also include its own processing circuitry. As schematically illustrated in FIG. 5, the fingerprint sensor 102 may send data (e.g. image data) to the pre-processing module 304. The pre-processing module 304 has the capability to communicate back to the fingerprint sensor 102. Further, the pre-processing module 304 may retrieve stored fingerprint features from the data storage 502.

The pre-processing module 304 may also store data related the acquired image data on the data storage 502, for example in the case of updating the fingerprint ridge flow characteristics in an adaptive mode. The pre-processing module 304 may further communicate with the device controller 302 in order to wake up the device controller 302, i.e. transition the device controller 302 from the partly in-active mode to the partly active mode. The device controller 302 may also receive information from the matching step from the pre-processing module 304. Further, the device controller also has access to fingerprint templates stored on the data storage 502. The fingerprint sensor 102 may also communicate with the device controller 302. For example, the image data may be sent from the fingerprint sensor 102 to the device controller 302, although alternatively, it is also possible for the pre-processing module 304 to send the image data to the device controller 302. The device controller is in the partly in-active mode until it receives an instruction generated by the pre-processing module to transition to the partly active mode.

The device controller 302 and the pre-processing module 304 may each include a microprocessor, microcontroller, programmable digital signal processor or another programmable device. The device controller 302 and the pre-processing module 304 may also, or instead, each include an application specific integrated circuit, a programmable gate array or programmable array logic, a programmable logic device, or a digital signal processor. Where the device controller 302 or the pre-processing module 304 includes a programmable device such as the microprocessor, microcontroller or programmable digital signal processor mentioned above, the processor may further include computer executable code that controls operation of the programmable device. It should be understood that all or some parts of the functionality provided by means of the device controller 302 and the pre-processing module 304 (or generally discussed as "processing circuitry") may be at least partly integrated with the fingerprint sensor 102.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for transitioning a device controller comprised with an electronic device from an at least partly inactive mode to an at least partly active mode, the electronic device further comprising a pre-processing module and a fingerprint sensor configured to acquire image data, said method comprising the steps of:
   determining the presence of an object at a vicinity of the fingerprint sensor;
   acquiring, using the fingerprint sensor, image data representative of the object;
   pre-processing the acquired image data, using the pre-processing module, to determine features indicative of a fingerprint, wherein the device controller is in the at least partly inactive mode;
   matching, using the pre-processing module, the determined features with at least one set of stored fingerprint features of a finger of a user of the electronic device;
   generating an instruction to transition the device controller to the at least partly active mode if a result of the matching indicates that the acquired image data corresponds to the at least one set of stored fingerprint features of the finger of the user of the electronic device;
   providing the acquired image data and information relating to the matching performed at the pre-processing module to the device controller being transitioned to the at least partly active mode; and
   performing a fingerprint authentication procedure, using the device controller, based on the image data, the information relating to the matching performed at the pre-processing module, and at least one fingerprint template,
   wherein the pre-processing module is integrated with the fingerprint sensor and is separate from the device controller.

2. The method according to claim 1, wherein the step of matching comprises determining a matching score between the image data and the at least one set of stored fingerprint features, and determining that the image data corresponds to stored fingerprint features of the one finger of the user of the electronic device if the matching score exceeds a threshold.

3. The method according to claim 2, further comprising adjusting the threshold based on the acquired image data.

4. The method according to claim 3, further comprising, when the acquired image data corresponds to the at least one set of stored fingerprint features of the finger of user of the electronic device, updating the at least one set of stored fingerprint features based on the acquired image data.

5. The method according to claim 1, wherein a false accept rate of the matching, using the pre-processing module, is substantially higher than a false accept rate of the fingerprint authentication procedure.

6. The method according to claim 1, further comprising the step of:
   unlocking the electronic device if the fingerprint authentication procedure results in a decision that the image data matches the at least one fingerprint template.

7. The method according to claim 1, wherein the at least one set of stored fingerprint features of finger of the user comprises predetermined fingerprint ridge flow characteristics.

8. The method according to claim 7, wherein the predetermined fingerprint ridge flow characteristics comprises a set of global ridge flow patterns.

9. The method according to claim 8, wherein the set of global ridge flow patterns comprises at least one of information relating to an arch, a tented arch, a right loop, a left loop, and a whorl.

10. The method according to claim 7, wherein the predetermined fingerprint ridge flow characteristics comprises a set of local ridge flow descriptors.

11. The method according to claim 10, wherein the local ridge flow descriptors comprises at least one of local ridge orientation, or ridge curvature, or ridge density.

12. The method according to claim 7, further comprising the step of:
   updating the predetermined fingerprint ridge flow characteristics based on the acquired image data.

13. The method according to claim 1, wherein the at least partly inactive mode is a low power mode and the at least partly active mode is a normal operational mode for the device controller.

14. An electronic device, comprising:
   a device controller, the device controller configured to be arranged in an at least partly inactive mode or an at least partly active mode;
   a pre-processing module; and
   a fingerprint sensor configured to acquire image data, wherein the pre-processing module is integrated with the fingerprint sensor and is separate from the device controller and wherein the electronic device is arranged to perform the method of claim 1.

15. The electronic device according to claim 14, wherein the fingerprint sensor is a capacitive fingerprint sensor.

16. The electronic device according to claim 14, wherein the electronic device is a mobile phone.

17. A computer program product comprising a non-transitory computer readable medium having stored thereon computer program means for controlling an electronic device, the electronic device comprising a device controller configured to be arranged in an at least partly inactive mode or an at least partly active mode, a pre-processing module, and a fingerprint sensor configured to acquire image data, wherein the pre-processing module is integrated with the fingerprint sensor and is separate from the device controller, and wherein the computer program product comprises code for performing the method of claim 1.

18. The method according to claim 1, wherein the fingerprint authentication procedure comprises a coarse part and a detailed part, and wherein the information relating to the matching performed at the pre-processing module comprises the coarse part of the fingerprint authentication procedure.

19. The method according to claim 1, wherein the at least one set of stored fingerprint features is different from the at least one fingerprint template.

20. The method according to claim 10, wherein the at least one set of stored fingerprint features comprises a portion of the at least one fingerprint template.

* * * * *